(12) United States Patent
Gartner et al.

(10) Patent No.: US 9,469,546 B2
(45) Date of Patent: Oct. 18, 2016

(54) PROCESS FOR THE MINERALIZATION OF CARBON DIOXIDE

(75) Inventors: Ellis Gartner, Lyons (FR); Alexander Pisch, Villefontaine (FR)

(73) Assignee: LAFARGE, Paris (FR)

( * ) Notice: Subject to any disclaimer, the term of this patent is extended or adjusted under 35 U.S.C. 154(b) by 283 days.

(21) Appl. No.: 14/123,987

(22) PCT Filed: Jun. 4, 2012

(86) PCT No.: PCT/EP2012/060480
§ 371 (c)(1),
(2), (4) Date: Dec. 5, 2013

(87) PCT Pub. No.: WO2012/168176
PCT Pub. Date: Dec. 13, 2012

(65) Prior Publication Data
US 2014/0120022 A1    May 1, 2014

(30) Foreign Application Priority Data

Jun. 7, 2011   (EP) .................................... 11305696

(51) Int. Cl.
| | |
|---|---|
| *B01D 53/62* | (2006.01) |
| *C01B 33/22* | (2006.01) |
| *C01B 33/32* | (2006.01) |
| *C01F 5/24* | (2006.01) |
| *B01D 53/78* | (2006.01) |
| *B01D 53/80* | (2006.01) |

(52) U.S. Cl.
CPC .............. *C01B 33/32* (2013.01); *B01D 53/62* (2013.01); *B01D 53/78* (2013.01); *B01D 53/80* (2013.01); *C01B 33/22* (2013.01); *C01F 5/24* (2013.01); *B01D 2251/304* (2013.01); *B01D 2251/306* (2013.01); *B01D 2251/402* (2013.01); *B01D 2251/60* (2013.01); *B01D 2251/604* (2013.01); *B01D 2251/606* (2013.01); *B01D 2257/504* (2013.01); *B01D 2258/0283* (2013.01); *Y02C 10/04* (2013.01); *Y02C 10/06* (2013.01); *Y02P 20/152* (2015.11)

(58) Field of Classification Search
None
See application file for complete search history.

(56) References Cited

U.S. PATENT DOCUMENTS

| | | |
|---|---|---|
| 5,085,838 A | 2/1992 | Mason |
| 2009/0202410 A1 | 8/2009 | Kawatra et al. |
| 2010/0196235 A1 | 8/2010 | Geerlings et al. |

FOREIGN PATENT DOCUMENTS

| | | |
|---|---|---|
| JP | 2007-146094 | 6/2007 |
| WO | WO 2010/097451 | 9/2010 |

OTHER PUBLICATIONS

International Search Report as issued for International Application No. PCT/EP2012/060480, dated Jul. 31, 2012.
International Preliminary Report on Patentability as issued for International Application No. PCT/EP2012/060480, dated Dec. 27, 2013.

*Primary Examiner* — Daniel Berns
(74) *Attorney, Agent, or Firm* — Pillsbury Winthrop Shaw Pittman LLP

(57) ABSTRACT

A process for the mineralization of carbon dioxide to form a magnesium carbonate compound, which process includes contacting the carbon dioxide, in the free form, or in the form of an alkali metal carbonate or bicarbonate, with an alkali metal magnesium silicate to produce the magnesium carbonate compound.

5 Claims, 1 Drawing Sheet

PROCESS FOR THE MINERALIZATION OF CARBON DIOXIDE

CROSS-REFERENCE TO RELATED APPLICATIONS

This is the U.S. National Stage of PCT/EP2012/060480, filed Jun. 4, 2012, which in turn claims priority to European Patent Application No. 11305696.4, filed Jun. 7, 2011, the entire contents of both applications are incorporated herein by reference in their entireties.

This invention relates to a process for the mineralization of carbon dioxide from, for example, a gas stream such as the flue gases from an industrial combustion process. The process uses as starting material an alkali metal magnesium silicate and produces magnesium carbonate compounds and silica.

Magnesium silicate rocks make up the majority of the Earth's mantle, and large surface deposits of such rocks are also found in many locations. The composition of the Earth's mantle is about 70% basic magnesium orthosilicate ($Mg_2SiO_4$), and, when this material is found in crystalline form close to the Earth's surface, it is generally in the form of olivine, which is essentially a solid solution between forsterite (pure $Mg_2SiO_4$) and fayalite (pure $Fe_2SiO_4$), representing the two main components of the Earth's mantle. In the Earth's crust, in addition to olivine, anhydrous magnesium silicates also occur as pyroxenes, such as enstatite ($MgSiO_3$). Due to the action of water, either at the surface or at depth within the Earth's crust, anhydrous magnesium silicates are converted into magnesium silicate hydrate minerals such as serpentine or chlorite (with the idealised overall composition $Mg_3Si_2O_5(OH)_4$), and also talc (with the idealised overall composition ($Mg_3Si_4O_{10}(OH)_2$).

Magnesium silicate rocks constitute an excellent source of basic magnesium which should in theory readily be converted into stable magnesium carbonate compounds by the action of carbon dioxide gas under normal atmospheric conditions. However, in practice, the weathering and carbonation of natural magnesium silicate minerals at the Earth's surface occurs only very slowly. Thus, while the use of magnesium silicates as a source of basic magnesium for the mineralization of carbon dioxide has been proposed as a means to combat the current trend towards increasing carbon dioxide levels in the atmosphere, processes to achieve such mineralization have heretofore been excessively energy-intensive, as well as excessively expensive to set up and operate, and, and thus have not been commercialized. One of the major technical difficulties which renders such processes so expensive to set up and operate is the need to use elevated pressures and temperatures in order to achieve a sufficiently high rate (for industrial purposes) of carbonation of magnesium silicate minerals. Typically, the carbon dioxide gas must first be purified and then compressed to pressures in excess of 70 atmospheres, and then contacted with finely-ground magnesium silicates in a pressure reactor at temperatures of 120-200° C. This requires specialized equipment which is expensive to build and maintain, as well as large amounts of electric power to operate the gas purification and pressurization process as well as to finely grind the magnesium silicate rocks.

Although the common magnesium silicate minerals listed above tend to be very "unreactive," (e.g. in that they have high melting points and also dissolve only very slowly in water or dilute acids), it is known that they will react rapidly with molten alkali metal carbonates, such as sodium carbonate ($Na_2CO_3$). Such a process, commonly referred to as a "carbonate fusion", is often used in the preparation of minerals for chemical analysis. Generally, a large excess of solid alkali metal carbonate (typically at least ten parts of alkali metal carbonate to one part of magnesium silicate rock) is added and the mixture heated to well above the melting point of the alkali metal carbonate. The magnesium silicate completely dissolves in the resulting melt, which after cooling, can easily and rapidly be dissolved in a strong aqueous acid and the solution then analysed by standard chemical techniques, thus allowing for total elemental analysis of the rock. The carbonate fusion process is a small scale process; it is analytical, not preparative, and is not energy-efficient as it involves melting a large excess of alkali metal carbonate in order to fully dissolve the magnesium silicate.

The present invention seeks to provide a process for the capture of carbon dioxide ($CO_2$) by means of a process which may be effected at, for example, atmospheric pressure using an alkali metal magnesium silicate which can be prepared from magnesium silicate rock and/or a process capable of removing carbon dioxide directly from a typical industrial flue gas stream without any pre-concentration step.

The present invention accordingly provides a process for the mineralization of carbon dioxide to form a magnesium carbonate compound, which process comprises contacting the carbon dioxide, in the free form or in the form of an alkali metal bicarbonate or carbonate, with an alkali metal magnesium silicate to produce the magnesium carbonate compound.

The alkali metal is preferably potassium or, more preferably, sodium.

The process is preferably effected at a temperature of 25 to 100° C., more preferably 35 to 80° C. The carbon dioxide may be in the free form in a gas comprising carbon dioxide.

Figure 1:
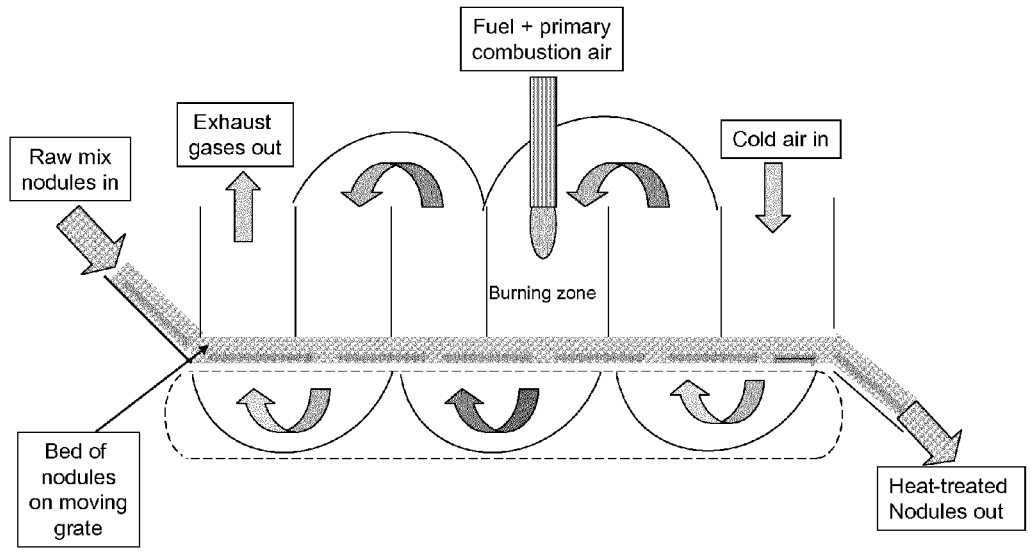
FIG. 1 shows a process for preparing alkali metal magnesium silicate according to an embodiment of the invention.

The process of the invention can be used to remove carbon dioxide from a gas at a reduced or elevated pressure or, for example, at about atmospheric pressure. The process of the invention may be carried out on a carbon dioxide-containing gas at an absolute pressure generally from 0.5 to 100 bar, preferably from 1 to 20 bar, most preferably at about 1 bar.

The gas to be treated may contain from 0.01% to 100% carbon dioxide by volume, preferably from 0.1% to 50%, more preferably from 1% to 40%, and most preferably from 4% to 30%. The gas stream may be a flue gas from an industrial combustion process.

The carbon dioxide may also be in the form of an alkali metal carbonate or bicarbonate formed by contacting a gas comprising carbon dioxide with an alkali metal hydroxide or an alkali metal carbonate. The alkali metal carbonate or bicarbonate is preferably produced in the form of an aqueous solution, prepared by reaction between an aqueous solution of an alkali metal hydroxide or carbonate and gaseous carbon dioxide.

The alkali metal magnesium silicate is preferably in particulate form, for example a powder, preferably having a Blaine specific surface area of 100 to 800 m²/kg, more preferably 200 to 650 m²/kg.

The process according to the invention is preferably effected with a product comprising alkali metal magnesium silicate. The alkali metal magnesium silicate is preferably prepared by the reaction of an alkali metal carbonate compound, which compound is an alkali metal carbonate, an alkali metal bicarbonate, or a mixture thereof, with a magnesium silicate. The alkali metal carbonate compound used preferably comprises alkali metal carbonate produced by contacting a gas comprising carbon dioxide with an alkali metal magnesium silicate generally in the presence of water, the alkali metal magnesium silicate being converted into a solution of an alkali metal carbonate plus solid residues comprising magnesium carbonates and a largely amorphous product rich in silica and containing some magnesium by reaction with the carbon dioxide, and the alkali metal carbonate solution being separated and concentrated prior to reaction with the magnesium silicate. The invention also provides a process for the preparation of a product comprising an alkali metal magnesium silicate compound (which compound is preferably of composition $R_2O.MgO.SiO_2$, (in which R represents an alkali metal), which process comprises the reaction, at a temperature from 500 to 1100° C., of an alkali metal carbonate compound, which compound is an alkali metal carbonate, an alkali metal bicarbonate or a mixture thereof, with a magnesium silicate, the molar ratio of alkali metal carbonate compound, expressed as alkali metal oxide of the formula $R_2O$, in which R represents an alkali metal, to magnesium silicate, expressed as silicon dioxide, of the formula $SiO_2$, being from 2:1 to 1:2, which reaction produces the product comprising an alkali metal magnesium silicate.

A product in shaped or particulate form which comprises an alkali metal magnesium silicate produced by this process constitutes a feature of the invention.

The invention also provides a slurry, generally aqueous, comprising an alkali metal magnesium silicate produced by this process.

The molar ratio of alkali metal carbonate compound, expressed as alkali metal oxide, to magnesium silicate expressed as silicon dioxide is preferably from 2:1 to 1:2, more preferably from 3:2 to 2:3, for example 4:3 to 3:4. The ratio is most preferably about 1.

The alkali metal carbonate compound is preferably an alkali metal carbonate. It will be understood that when the alkali metal carbonate compound comprises bicarbonate the latter will generally decompose to the corresponding carbonate at the temperatures used to prepare the alkali metal magnesium silicate.

The alkali metal carbonate compound may be anhydrous or hydrated. Hydrates of sodium carbonate include the monohydrate and decahydrate. Hydrates of potassium carbonate include the sesquihydrate (also known as hemihydrate). It is preferable, when economically feasible, to use anhydrous alkali metal carbonate compounds to avoid the expenditure of energy required to remove water of hydration.

The magnesium silicate used in the preparation of the alkali metal magnesium silicate is generally a mineral silicate, for example a rock comprising a high concentration, preferably 20% or more, more preferably 50% or more, of a magnesium silicate of the general formula:

$m(MgO).t(MeO).SiO_2.xH_2O$ wherein Me represents a metal or metals other than magnesium, (such as, for example, calcium and/or iron); m is from 0.5 to 3, preferably from 1 to 3, t is less than or equal to 1, and x is from zero to 2.

Such minerals include olivines, e.g. forsterite and monticellite; serpentines, e.g. antigorite, chrysotile, lizardite, sepiolite and garnierite; pyroxenes, e.g. enstatite, diopside, bronzite and hypersthene; amphiboles, e.g. amosite, anthophyllite, tremolite and actinolite; humites, e.g. chondrodite and norbergite; and other minerals such as chlorite, talc, iddingsite and hectorite. These minerals may contain substantial quantities of calcium, iron and alkali metals in addition to magnesium and silicon.

Asbestos comprises a group of naturally occurring minerals which includes fibrous serpentine (e.g. chrysotile) and amphibole (e.g. amosite, anthophyllite, tremolite and actinolite) minerals. The fibrillar forms of asbestos are known to be harmful to health and are considered to be human carcinogens. The process of the invention provides a means of converting these minerals into useful (and non-carcinogenic) materials.

The mineral silicate used to prepare the alkali metal magnesium silicate is preferably a basic magnesium silicate. The $MgO/SiO_2$ molar ratio is preferably from 1 to 3. The $CaO/SiO_2$ molar ratio is preferably ≤0.5. The $FeO/SiO_2$ molar ratio is preferably ≤0.5. The content of other elements in terms of the (total oxides)/$SiO_2$ molar ratio is preferably ≤0.2.

The alkali metal carbonate compound used in the preparation of the alkali metal magnesium silicate may be a mineral, for example trona (tri-sodium hydrogen dicarbonate dihydrate; $Na_3H(CO_3)_2.2H_2O$), or a commercially available compound. It may contain impurities, for example hydroxides and silicates and, generally in smaller amounts, other impurities, e.g. chlorides, sulfates, sulfites, nitrates and nitrites. If impurities (e.g. alkali metal nitrates, nitrites or hydroxides) are present which, at the temperature used to prepare the alkali metal magnesium silicate, decompose to an alkali metal oxide, they should be taken into account when calculating the amount of alkali metal oxide.

The process used to prepare the alkali metal magnesium silicate is preferably effected at a temperature from 600 to 1000° C., for example 700 to 950° C., more preferably from 800 to 950° C. Heating is generally effected for a few minutes to a few hours, for example from 5 minutes to 24 hours, preferably from 10 minutes to 4 hours.

The process is preferably effected at a temperature at which the magnesium silicate is solid and the alkali metal carbonate corresponding to the alkali metal carbonate compound is slightly below its melting point.

We have found, unexpectedly, that it is possible to obtain a high degree of reaction between an alkali metal carbonate compound, preferably an alkali metal carbonate, and a magnesium silicate when the two materials are contacted with each other in the solid state. They are preferably in particulate form, for example as powders. A mixture of the compounds is preferably heated, for example in a furnace, to a temperature close to, but below, the melting point of the alkali metal carbonate corresponding to the alkali metal compound. The ratio of the carbonate and silicate used is preferably substantially equal to the stoichiometric ratio calculated on the basis that one mole of alkali metal oxide (written generically as "$R_2O$" in which R represents an alkali metal) present in the alkali metal carbonate compound, is equivalent to one mole of silica ($SiO_2$) present in the magnesium silicate. For example, the stoichiometric mass ratio for the reaction between pure forsterite ($Mg_2SiO_4$, mol. wt.=140) and pure anhydrous sodium carbonate ($Na_2CO_3$, mol. wt.=106) would be 140:106. It will be understood that the actual silicate and carbonate sources used in practice will not always be pure, but the idealized stoichiometric ratio refers to that in which the heated mixture has an overall molar ratio of $R_2O:SiO_2$ substantially equal to unity.

The magnesium silicate and alkali metal carbonate compound used to prepare the alkali metal magnesium silicate are preferably in particulate form or in shaped form, e.g. as pellets. Rock used to provide the magnesium silicate and/or alkali metal carbonate compound for the preparation of the alkali metal magnesium silicate will generally be dried, crushed and, if necessary, ground (for example co-ground) to a desired particle size distribution. For example the magnesium silicate may be crushed to the granulometry of fine sand (grain size 0.06 to 0.2 mm) or, if necessary, ground to a fine powder (grain sizes below 0.06 mm). Grain sizes greater than 0.06 mm are generally determined by sieving. Grain sizes lower than 0.06 mm are generally determined by laser granulometry. Undesirable mineral impurities can be separated to the extent consistent with energy efficiency by mechanical or other separation methods.

In one embodiment the process to prepare the alkali metal magnesium silicate is conducted in a moving grate furnace.

For example a mixture of alkali metal carbonate compound and magnesium silicate, each in particulate form, is formed into pellets (e.g. using a disc or drum pelletizer). Water may be added to the mixture to facilitate the pelletising process. The pellets are fed onto a moving grate comprising, for example, a high-temperature-resisting steel alloy, where they are heated, for example, by the passage of hot gases, for example fuel combustion gases. The hot gases may be drawn through the bed of pellets on the grate by fans, usually placed under the grate. The process is illustrated diagrammatically in FIG. 1 of the accompanying drawings.

Typically, the hot gases are produced by burning, in an excess of air, a fossil fuel, such as natural gas, oil or coal; waste- or biomass-derived fuels, such as wood chips or waste fermentation gases, may also be used. Preferably the fuel used should have a low sulfur content, for example, <1%. The passage of hot gases through the bed heats the particles up, ultimately, to the desired temperature.

The rate of heating is controlled, for example, by varying the amount of fuel, the speed of the moving grate and/or the speed of the ventilation fans in order to ensure good overall energy efficiency and also to ensure that the pellets retain their mechanical integrity during the process. The moving grate is designed so that the gases may be passed through the bed several times along the length of the grate to allow for efficient heat transfer between the gases and the pellets, so that the gases leaving the furnace are as cool as possible. Moreover, once the pellets pass through the hottest zone ("burning zone") just after the combustion of the fuel, they are cooled by passing air through the bed, such that they reach as low a temperature as possible before being discharged from the bed. The incoming air, thus preheated by the outgoing solid particles, is used as the main air supply for combustion of fuel in the burning zone, thus leading to a high overall thermal efficiency for this type of furnace. The theoretical overall chemical reaction occurring during the heating process is shown below in equation (1) for the reaction between forsterite ($Mg_2SiO_4$) and an alkali metal carbonate:

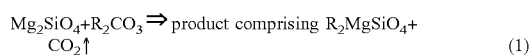

(1)

in which R is as hereinbefore defined: R preferably represents sodium.

The vertical arrow ↑ after $CO_2$ indicates that the carbon dioxide gas produced by this reaction escapes from the bed and exits with the rest of the exhaust gases. The idealized reaction depicted in equation (1) illustrates the production of a product comprising an alkali metal magnesium silicate by direct reaction of a stoichiometric mixture of forsterite and an alkali metal carbonate. This type of reaction is very endothermic, mainly due to the liberation of carbon dioxide gas: it consumes about 2.6 kJ (i.e. about 0.6 kcal) of heat per gram of $CO_2$ liberated. Thus, regardless of the temperature at which the reaction is conducted, the net energy consumption for the overall process will be significant. However, if the reaction is conducted, as described above, in a furnace system which allows for good counter-current heat exchange between the outgoing hot gases and the incoming solids, and likewise between the outgoing hot solids and the incoming combustion air, the net energy consumption can be reduced to a value close to the theoretical limit given above. It is important, for energy efficiency, to have efficient counter-current heat exchange at both the beginning and the end of the process, incoming and outgoing, for example in a moving grate furnace as described above.

In a further embodiment, the preparation of the alkali metal magnesium silicate is conducted in a system comprising moving grates for pre-heating and cooling and a rotary kiln in a decarbonation step which produces carbon dioxide.

When a moving grate system is used it is important to maintain the solid in the form of suitably-sized pellets so that they form a porous bed on the grate, allowing for the passage of gases. The pellets preferably retain their mechanical integrity; they preferably also maintain their mean size within pre-determined limits.

According to a feature of the invention, in order to facilitate maintenance of the mechanical integrity of the pellets either (a) the maximum solids temperature in the process does not substantially exceed the melting point of the alkali metal carbonate corresponding to the alkali metal carbonate compound, and/or (b) the maximum solid volume fraction of melt-forming material (substantially alkali metal carbonate) in the pellets is generally below the value at which the nodule will deform significantly even if the alkali metal carbonate melts. This value is generally below about 40% of the total solids volume. In order to achieve this, it may sometimes be necessary to reduce the $R_2O/SiO_2$ ratio of the initial pellet composition to a value substantially below the preferred stoichiometric ratio of 1. The degree of reaction of the magnesium silicate during the process will then also be less than 100% but the effect of this can potentially be mitigated by separating the unreacted magnesium silicate from the reaction products and recycling it together with additional magnesium silicate starting material in the production of a fresh batch of pellets.

According to a further feature of the invention the preparation of the alkali metal magnesium silicate is conducted in a suspension preheater system comprising a plurality of cyclones in a preheater and, for example, a rotary kiln, for example as used in a typical modern cement plant. The starting materials, for example as a mixed substantially dry powder, are fed (cold) into the top cyclone of the preheater. During its passage through the preheater cyclone tower, by counter-current heat exchange with kiln exit gases, the material is heated close to the melting point of the alkali metal carbonate corresponding to the alkali metal carbonate compound, but without reaching this melting point, in order to avoid, for example, the formation of accretions on the walls of the preheater. At the bottom of the preheater tower, the mixed powder enters a rotary kiln in which, as the temperature rises to the melting point of the alkali metal carbonate, the powder self-nodulizes. The ratio of alkali metal carbonate compound to magnesium silicate and/or the particle size distribution of the magnesium silicate and alkali metal carbonate compound in particulate form is chosen to promote self-nodulization. The $R_2O/SiO_2$ ratio may be less than 1 if necessary in order to form substantially stable nodules. The nodules are decarbonated in the rotary kiln. The decarbonated nodules are then cooled, for example on a moving grate cooler also as used in typical modern cement plants. The heat of the hot nodules can be used to preheat the incoming combustion air for the kiln by counter-current heat exchange.

The cooled decarbonated pellets or nodules, comprising alkali metal magnesium silicate are then used in a gas scrubbing system designed to remove carbon dioxide from a gas at a reduced or elevated pressure or, for example, at about atmospheric pressure.

In one embodiment of the invention, the cooled decarbonated pellets or nodules, comprising alkali metal magnesium silicate, are ground in water to make an aqueous suspension or slurry which can be directly injected into a conventional gas scrubbing system, such as a spray tower.

In another embodiment of the invention, the cooled decarbonated pellets or nodules, comprising alkali metal magnesium silicate, are packed into a vertical column to form a packed bed of pellets through which a gas can be passed from bottom to top, while at the same time a suitably-controlled spray of water is added at the top of the column to ensure that the pellets remain wet. This constitutes a counter-current packed-bed gas absorber column. The flow of water leaving the bottom of this column is collected and treated as described later in more detail. The pellets or nodules used to form this type of packed bed column may be pre-selected for their dimensions and mechanical strength.

In both of the above embodiments, the reactions occurring in the gas scrubbing system or gas absorber column are as follows:

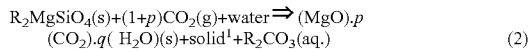

(2)

Where:

The terms (s), (g) and (aq.) indicate solid, gas, and aqueous solution, respectively, p is >0 and less than or equal to 1. Preferably, p is greater than or equal to 0.5 q may be zero but can also take values as high as 3 in some cases.

The principal solid products are:

a magnesium carbonate compound, $(MgO).p(CO_2).q(H_2O)$, which may contain more than one chemical compound, and in which a significant fraction of the carbon dioxide captured from the gas stream is contained in a stable solid form; and solid[1] which is a largely amorphous solid rich in silica and containing some magnesium.

These two principal solid products will generally be intimately mixed.

Other minor solid products that may also be present include iron oxides, hydroxides or carbonates, as well as calcium carbonates.

The alkali metal carbonate solution resulting from the gas scrubbing process will, if reaction (2) goes to completion, contain all of the alkali metal ions present in the original solid product. It is therefore desirable to separate this alkali metal carbonate solution and extract the alkali metal carbonates in solid form for re-use in the high temperature process according to reaction (1). In principle, this can be done most effectively by a combination of evaporation and crystallization processes, making use of the waste heat available both from the decarbonation reaction (1) and also from the flue gas scrubbing system, (noting that reactions (2) and (3) are both highly exothermic and thus that the gas scrubbing system itself is likely to operate at a higher temperature than the temperature of the flue gases being treated by it, thus producing a hot solution of alkali metal carbonate).

Some other salts may be present in the alkali metal carbonate solution due to impurities in the magnesium silicate rocks or the flue gases. The most common impurities are likely to be alkali metal sulfates, sulfites, nitrates and nitrites. Under certain circumstances it may be necessary to separate these salts from the recycled alkali metal carbonate by specialized crystallization and washing procedures.

In yet another embodiment of the invention, the cooled decarbonated pellets or nodules, comprising alkali metal magnesium silicate, are crushed, and if necessary ground, to a suitable median particle size. They are then contacted with a solution comprising an alkali metal bicarbonate in, for example, a tank, preferably with some mechanical stirring. The alkali metal bicarbonate solution may originate from a gas scrubbing system designed to capture carbon dioxide from a gas at, for example, atmospheric pressure. Typical reactions between the alkali-metal bicarbonate solution and the solids in this case is shown by the following equations:

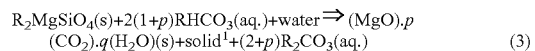

(3)

The solid[1] is as described above.

The alkali metal bicarbonate solution ($RHCO_3$(aq.)) used in reaction (3) may be formed by the reaction of the alkali metal carbonate solution ($R_2CO_3$(aq.)) produced in reaction (3) with carbon dioxide and water as shown in reaction (4):

(4)

This reaction can be conducted in a separate gas scrubbing system, thus participating in a closed-loop alkali-carbonate/bicarbonate gas scrubbing system.

The reactions described above are capable of capturing a large amount of carbon dioxide and converting it into substantially stable solid magnesium carbonate compounds. The magnesium carbonate solid produced may comprise either simple magnesium carbonates, such as magnesite ($MgCO_3$) or nesquehonite ($MgCO_3.3H_2O$), or complex magnesium hydroxy-carbonate hydrates, such as artinite ($Mg(OH)_2.MgCO_3.3H_2O$), or hydromagnesite, ($Mg(OH)_2.4MgCO_3.4H_2O$), depending on the conditions. All of these precipitated solids, plus the solid[1], will in many cases be finer than the unreacted starting material ($Mg_2SiO_4$ in this example), and so could be separated from it by sedimentation and then separated from the alkali metal carbonate which remains in solution by filtration. The unreacted starting material ($Mg_2SiO_4$ in this case) thus separated can be recycled to the beginning of the process. The alkali metal carbonate solution can be concentrated, e.g. by evaporation, allowing the solids to be crystallized and also recycled to the start of the process. The mixture of magnesium carbonates and largely amorphous product rich in silica and containing some magnesium produced by these reactions is one of the final products of the overall process (and constitutes a feature of the invention) and can be separated for disposal or for use in other processes.

One overall object of the process of the invention is to use common magnesium silicate rocks to capture gaseous $CO_2$ (e.g. from industrial flue gases) and convert it into a substantially stable magnesium carbonate compound.

Figure 2:
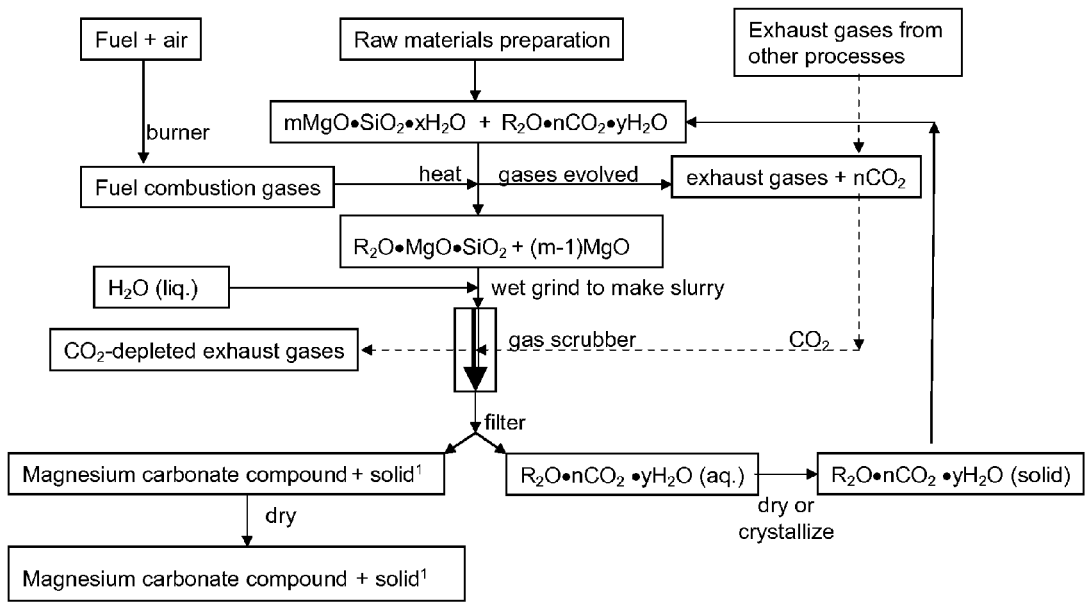
FIG. 2 shows a process for maximizing capture of $CO_2$ from exhaust gases according to an embodiment of the invention.

An example of a process of the invention which seeks to maximise capture of $CO_2$ from exhaust gases from other industrial processes and to convert it substantially completely into solid magnesium carbonates in an energy-efficient way, not requiring any high-pressure reactors or autoclaves of the type usually required for direct carbonation of magnesium silicates, is shown in FIG. 2 (in which solid[1] is a largely amorphous product rich in silica and containing some magnesium).

Raw materials are prepared to form a mixture of one part of a magnesium silicate ($mMgO.SiO_2.xH_2O$) plus another part being a combination of one or more alkali metal carbonate compounds for which the combined composition is represented by the formula ($R_2O.nCO_2.yH_2O$); the mixture is heated by fuel combustion gases from a burner supplied with fuel and air; the heated mixture reacts to form a product comprising an alkali metal magnesium silicate ($R_2O.MgO.SiO_2$) and to release carbon dioxide which mixes with the fuel combustion gases to form exhaust gases with excess carbon dioxide; liquid water is added to the reaction product and the product is wet ground to form a slurry; the slurry is contacted in a gas scrubber with the exhaust gases with excess carbon dioxide produced earlier and with $CO_2$-containing exhaust gases from other processes to absorb carbon dioxide and to produce a slurry comprising magnesium carbonate and silicon dioxide; the slurry is filtered to produce a filtercake comprising magnesium carbonate and a largely amorphous product rich in silica and containing some magnesium; the filter-cake is dried to produce a mixed solid product which is dried; the filtrate comprising alkali metal carbonate compound in solution is dried or crystallized to produce solid alkali metal carbonate compound which is recycled for use as starting material.

In this specification, including the accompanying claims, percentages unless otherwise indicated are by mass.

The term "pellets" as used in this specification including the accompanying claims is to be understood as embracing shaped, generally substantially spherical, forms such as pellets, nodules and granules.

Particle size and size distribution when measured by laser granulometry for particle sizes less than about 100 μm are measured using a Malvern MS2000 laser granulometer. Measurement is effected in ethanol. The light source consists of a red He—Ne laser (632 nm) and a blue diode (466 nm). The optical model is that of Mie and the calculation matrix is of the polydisperse type. The apparatus is checked before each working session by means of a standard sample (Sifraco C10 silica) for which the particle size distribution is known.

Measurements are performed with the following parameters: pump speed 2300 rpm and stirrer speed 800 rpm. The sample is introduced in order to establish an obscuration between 10 and 20%. Measurement is effected after stabilisation of the obscuration. Ultrasound at 80% is first applied for 1 minute to ensure the de-agglomeration of the sample. After about 30 s (for possible air bubbles to clear), a measurement is carried out for 15 s (15000 analysed images). Without emptying the cell, measurement is repeated at least twice to verify the stability of the result and elimination of possible bubbles.

All values given in the description and the specified ranges correspond to average values obtained with ultrasound.

Particle sizes and particle size distributions for particle sizes greater than about 100 μm are measured by sieving.

It is to be understood that in the foregoing text, unless otherwise specified, the symbols R, m, t, x, p, n, z and y are as initially defined.

The following non-limiting Examples illustrate embodiments of the invention.

EXAMPLE 1

Ground olivine sand of composition $(Mg_{0.94}Fe_{0.06})_2SiO_4$ was mixed with a sodium carbonate hydrate powder in a 14:11 mass ratio. 25 g of this powder was pressed into a pellet and placed into a lab furnace in a platinum crucible. It was heated up to 800° C. over 2 hours, maintained at 800° C. for 1 hour and cooled back to room temperature by natural cooling. In order to evaluate the reaction efficiency, separate samples of the sodium carbonate and olivine used underwent exactly the same heat treatment. The measured ignition losses are shown in the following Table 1:

TABLE 1

| Sample | Loss on Ignition |
| --- | --- |
| Sodium carbonate powder | 14.97% |
| Ground olivine sand | 0.22% |
| 14:11 mix of ground olivine sand + sodium carbonate powder | 16.69% |

The ignition loss of the pure sodium carbonate was due entirely to loss of hydrate water and not to decomposition or evaporation of the carbonate. The pure olivine sample remained essentially unchanged during heat treatment, but the mixed sample reacted. From the measured LOI data, it is estimated that 60% of the $CO_2$ from the carbonate was lost from the mixture. The phase constitution of the reacted sample was determined by X-ray diffraction. The reaction products observed by this technique included $Na_2MgSiO_4$ and $Fe_2O_3$ together with some unreacted olivine and sodium carbonate.

EXAMPLE 2

The same ground pure olivine sand $(Mg_{0.94}Fe_{0.06})_2SiO_4$ and sodium carbonate hydrate powder as used in Example 1 were mixed in a 1400:1235 mass ratio. (The molar ratio of this mixture is close to 1). The powder was pressed into pellets and placed (in a platinum crucible) into a lab furnace which was kept at 900° C. The sample was air-quenched after 1 h of heat treatment. Separate samples of the sodium carbonate and olivine used underwent an identical heat treatment. It is important to mention that at this temperature, sodium carbonate is in the liquid state. (The melting temperature of this compound is 851° C.). The measured loss on ignition of all of the samples is presented in the following Table 2:

TABLE 2

| Sample | Loss on Ignition |
| --- | --- |
| Sodium carbonate | 14.96% |
| Olivine | 0.04% |
| Olivine + Sodium carbonate | 23.02% |

From the measured LOI data, a conversion rate (degree of decarbonation) close to 100% was obtained which means that the reaction was essentially complete. The reaction product was analysed by X-ray diffraction and the main phases detected included $Na_2MgSiO_4$, together with some un-reacted olivine. No remaining sodium carbonate was detected, in agreement with the observed loss on ignition data.

EXAMPLE 3

The powdered product of Example 2 was mixed with water to give slurries (suspensions) with various solids concentrations, in some cases with the addition of various soluble salts to the initial aqueous solution. A sample of slurry was put in a closed reactor with a total volume of 1.65 liters, maintained at 35° C. and agitated with a mechanical stirrer operating at 500 rpm. The reactor was first evacuated and then filled with pure gaseous $CO_2$ up to one atmosphere pressure. The pressure of the gas, which decreased with time due to its adsorption by the slurry, was recorded continuously. Whenever the pressure reached a relatively constant value, further $CO_2$ was added again to bring it back to one atmosphere. By following the change of pressure with time between refills, it was possible to estimate the total amount of $CO_2$ consumed by reaction with the slurry. Results for a series of such experiments are summarized in Table 3.

EXAMPLE 4

A crushed sample of serpentine from Horsmanaho, Finland (ground in a ball mill to a powder with 43% passing a 75 micrometer sieve, and containing, by mass, 37.9% silicon expressed as $SiO_2$, 38.7% magnesium expressed as MgO, 7.4% iron expressed as $Fe_2O_3$, and with an ignition loss of 14.9% at 950° C.), was mixed with anhydrous sodium carbonate powder in a 5355:4645 mass ratio. About 5 kg of the mixed powder was pressed into a steel crucible and calcined in a lab furnace at 950° C. for 4.5 hours. The mass loss during calcination was 27.9%. From the measured mass loss it can be estimated that the decarbonation reaction was complete. The reaction product was analysed by X-ray fluorescence spectrometry and shown to contain 27.8% silicon expressed as $SiO_2$, 30.4% magnesium expressed as MgO, 5.7% iron expressed as $Fe_2O_3$, and 33.4% sodium expressed as $Na_2O$. An X-ray diffraction analysis showed the major phase present in the product to be $Na_2MgSiO_4$.

TABLE 3

| Experiment n° | Total CO2 captured (mol) | Slurry volume (mL) | Slurry conc. (g/L) | Total solids, (g) | CO2 captured, as % of theoretical maximum | Slurry additives | Temp. (° C.) | Duration (h) | Solid products detected |
|---|---|---|---|---|---|---|---|---|---|
| 1 | 0.0641 | 260 | 50 | 13.00 | 35 | Na2CO3: 21.15 g/L | 35 | 24 | Hydromagnesite |
| 2 | 0.0724 | 260 | 50 | 13.00 | 40 | Na2CO3: 53.85 g/L | 35 | 24 | Hydromagnesite |
| 3 | 0.1363 | 260 | 50 | 13.00 | 75 | NaHCO3: 53.85 g/L | 35 | 30 | Hydromagnesite |
| 4 | 0.0352 | 260 | 11.5 | 2.99 | 84 |  | 35 | 26 | Artinite |

The theoretical maximum $CO_2$ capture was calculated on the assumption that all of the carbonatable solids, expressed in terms of MgO and $Na_2O$ in the solids, would carbonate to give $MgCO_3$ and $Na_2CO_3$, respectively, irrespective of any slurry additives present. However, it was observed that the main solid products were usually hydromagnesite ($Mg(OH)_2 \cdot 4MgCO_3 \cdot 4H_2O$), and in one case artinite ($Mg(OH)_2 \cdot MgCO_3 \cdot 3H_2O$), which would imply a slightly lower amount of $CO_2$ capture than the maximum theoretical value. In experiment 4, during which no slurry additives were used (i.e. pure water was used to make the slurry) the amount of $CO_2$ captured, at 84% of theoretical, is actually slightly more than would be expected if artinite were the main magnesium carbonate formed, so it is likely that other carbonates were also formed but not detected. In any case, the result of experiment 4 shows that it is possible to essentially fully carbonate an aqueous suspension of the reaction product of Example 2 in about one day at atmospheric pressure. (Note also that the duration of these experiments was probably longer than necessary because they had to be left overnight unattended, during which time no additional $CO_2$ could be added to bring the pressure back up. If one atmosphere pressure of $CO_2$ had been maintained continuously, the reaction times would probably have been significantly shorter).

EXAMPLE 5

The reaction products of Example 2 (referred to here as "product X"), and of Example 4 (referred to here as "product XS") were ground to powders, and the finenesses of the resulting powders were measured using the Blaine Specific Surface Area (BSS) method. For each sample of product X or XS, 75 g of the solid were added to 1.5 liters of deionized water in a glass reactor equipped with a stirrer with a helicoidal Teflon® paddle operating at 500 rpm. Pure $CO_2$ gas was bubbled continuously through the agitated suspension (via a porous glass frit at the bottom) at a flow rate of 12 normal liters per hour (and at close to one atmosphere absolute pressure). The reactor was maintained at 70° C. by a jacket heated by circulating hot water. After various periods of time, samples of the suspension were taken to assess the progress of the carbonation reaction. The samples were filtered and the liquid filtrates were analysed for dissolved elements. The solid filter-cakes were dried at 110° C. and then analysed by X-ray fluorescence spectrometry for elemental composition, by X-ray diffraction for qualitative phase composition, and by thermal analysis coupled with evolved gas analysis for the quantitative detection of combined $CO_2$ and water. In order to calculate the amount of magnesium that had reacted, it was assumed that all of the $CO_2$ in the dried filter-cake was present in the form of hydromagnesite.

The results for three different product samples are given in Table 4:

TABLE 4

| Experiment N°; anhydrous product used | Duration (h) | Blaine specific surface area of anhydrous product, m²/kg | Main crystalline phases detected in dried filter-cake | Total Mg content of dried filter-cake, expressed as MgO, % | CO₂ content of dried filter-cake, % | Estimated Mg in hydro-magnesite expressed as % MgO in filter-cake | Mg in aqueous phase expressed as % MgO relative to filter-cake | Estimated degree of reaction of MgO in anhydrous product, % |
|---|---|---|---|---|---|---|---|---|
| 5 Product X | 3.5 | 420 | Hydro-magnesite | 31.2 | 15.9 | 18.2 | 0.6 | 59 |
| 6¹ Product X | 4.0 | 600 | Hydro-magnesite | 30.3 | 16.4 | 18.8 | 0.5 | 63 |
| 7 Product XS | 4.0 | 205 | Hydro-magnesite | 27.7 | 17.2 | 19.7 | 0.4 | 71 |

[1]In experiment 6, a high-power agitation system was used instead of the normal stirrer It can be seen from the above results that it is possible to carbonate products X and XS at only one atmosphere pressure in aqueous suspension and obtain conversion yields, of the order of 60-70% of the total magnesium in the starting material, in a time of 3.5 to 4 hours.

The invention claimed is:

1. A process for the mineralization of carbon dioxide to form a magnesium carbonate compound, which comprises preparing an alkali metal magnesium silicate by reacting, in the solid state and at 500-1100° C., an alkali metal carbonate compound which compound is an alkali metal carbonate, an alkali metal bicarbonate or a mixture thereof, with a magnesium silicate, wherein the molar ratio of alkali metal carbonate compound to magnesium silicate is from 2:1 to 1:2, wherein the alkali metal carbonate compound in the molar ratio is expressed as alkali metal oxide of the formula $R_2O$, in which R represents an alkali metal, and wherein the magnesium silicate in the molar ratio is expressed as silicon dioxide of the formula $SiO_2$, which reaction produces an alkali metal magnesium silicate, and contacting the carbon dioxide, in the free form or in the form of an alkali metal bicarbonate or carbonate, with an alkali metal magnesium silicate to produce the magnesium carbonate compound.

2. A process according to claim 1 in which the carbon dioxide is in the free form in a gas comprising carbon dioxide.

3. A process according to claim 1 in which the carbon dioxide is in the form of an alkali metal carbonate or bicarbonate formed by contacting a gas comprising carbon dioxide with an alkali metal hydroxide or an alkali metal carbonate.

4. A process according to claim 1 in which the reaction is effected at a temperature of 800 to 950° C.

5. A process according to claim 1 in which the magnesium silicate is of the general formula $m(MgO) \cdot SiO_2 \cdot xH_2O$ wherein m is from 0.5 to 3 and x is from zero to 2.

* * * * *